STUART & BRIDGE.
Fender.
No. 99,726. Patented Feb. 8, 1870.
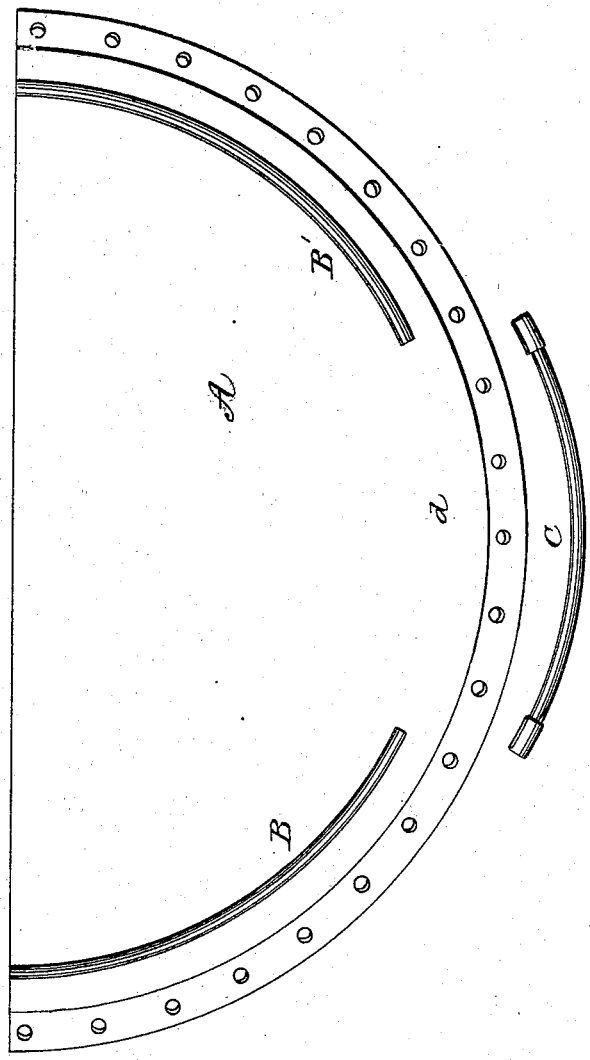
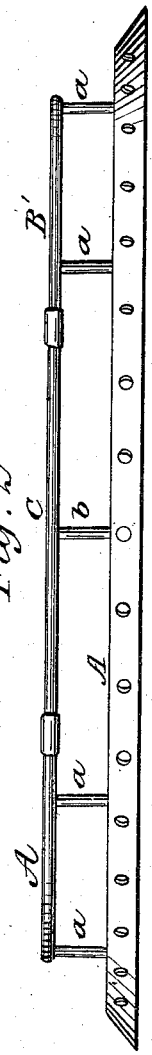
Witnesses:
Inventor:

United States Patent Office.

DAVID STUART AND LEWIS BRIDGE, OF PHILADELPHIA, PENNSYLVANIA, ASSIGNORS TO STUART, PETERSON, & CO., OF SAME PLACE.

Letters Patent No. 99,726, dated February 8, 1870; antedated August 9, 1869.

FENDER FOR FIRE-PLACE HEATERS.

The Schedule referred to in these Letters Patent and making part of the same.

*To all whom it may concern:*

Be it known that we, DAVID STUART and LEWIS BRIDGE, both of Philadelphia, Pennsylvania, have invented an Improvement in Fire-Place Stoves; and we do hereby declare the following to be a full, clear, and exact description of the same.

Our invention relates to the hearth-plate and fender of a fire-place stove; and consists in combining with the hearth-plate a fender-rail, composed of two fixed portions, and a central disconnected detachable portion which can be removed, so as to permit the ash-drawer to be drawn out, as described hereafter.

In order to enable others skilled in the art to make and use our invention, we will now proceed to describe its construction and operation, reference being had to the accompanying drawing, which forms a part of this specification, and in which—

Figure 1 represents a plan view of the hearth-plate for a fire-place stove, with fender attached to the same.

Figure 2, a front view of fig. 1.

On reference to figs. 1 and 2—

A represents the hearth-plate described in our application for a patent, filed February 25, 1869, as being situated in front of a fire-place stove.

The fender is composed of two permanent curved bars B and B' and a movable or detachable bar C, the two permanent portions being connected to the hearth-plate by pins *a a*, and the movable bar having a pin, *b*, fitting with its lower end in a hole, *e*, in the hearth-plate, the opposite ends of the bar C having sockets for fitting over and embracing the ends of the permanent portions B and B' of the fender.

When it becomes necessary to withdraw the ash-drawer from beneath the fire-place of the stove, the portion C of the fender is detached to make way for the said drawer, after the reintroduction of which beneath the fire-place the portion C is replaced, as shown in fig. 2, so as to become a continuation of the permanent portions of the fender.

We do not desire to claim, broadly, a hearth-plate with a movable fender or movable fender-rail; but

We claim, and desire to secure by Letters Patent—

A hearth-plate of a fire-place stove, in combination with a fender-rail composed of the two fixed portions B and B' and disconnected detachable portion C, all substantially as set forth.

In testimony whereof, we have signed our name to this specification, in the presence of two subscribing witnesses.

DAVID STUART.
LEWIS BRIDGE.

Witnesses:
J. HOWARD REVILLE,
JOSEPH McCLARY.